Jan. 24, 1956     H. R. GREENLEY     2,732,168
BY-PASS VALVE FOR POWER STEERING SYSTEMS
Filed Jan. 13, 1954     2 Sheets-Sheet 2
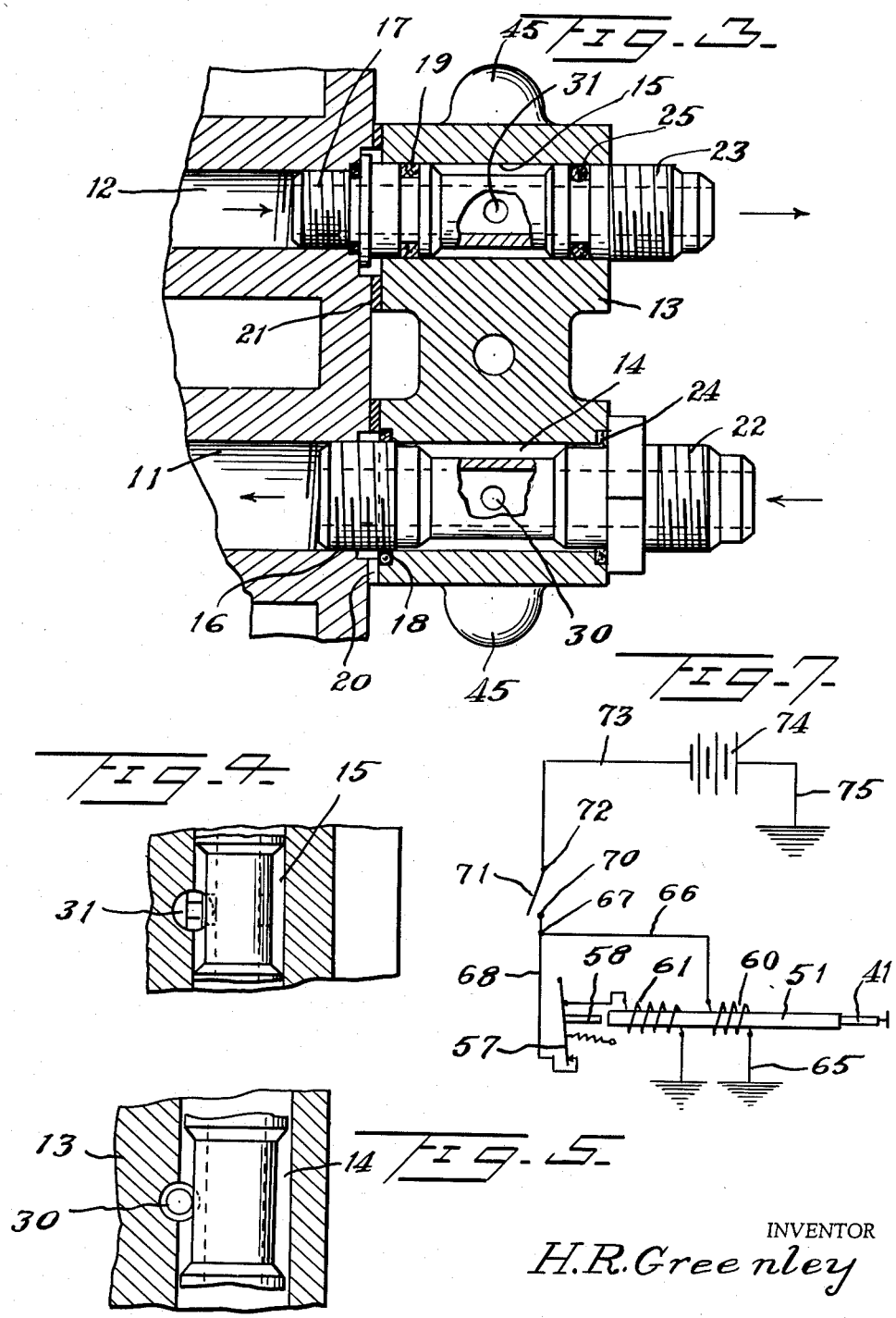
INVENTOR
H. R. Greenley
BY Kimmel & Crowell
ATTORNEYS

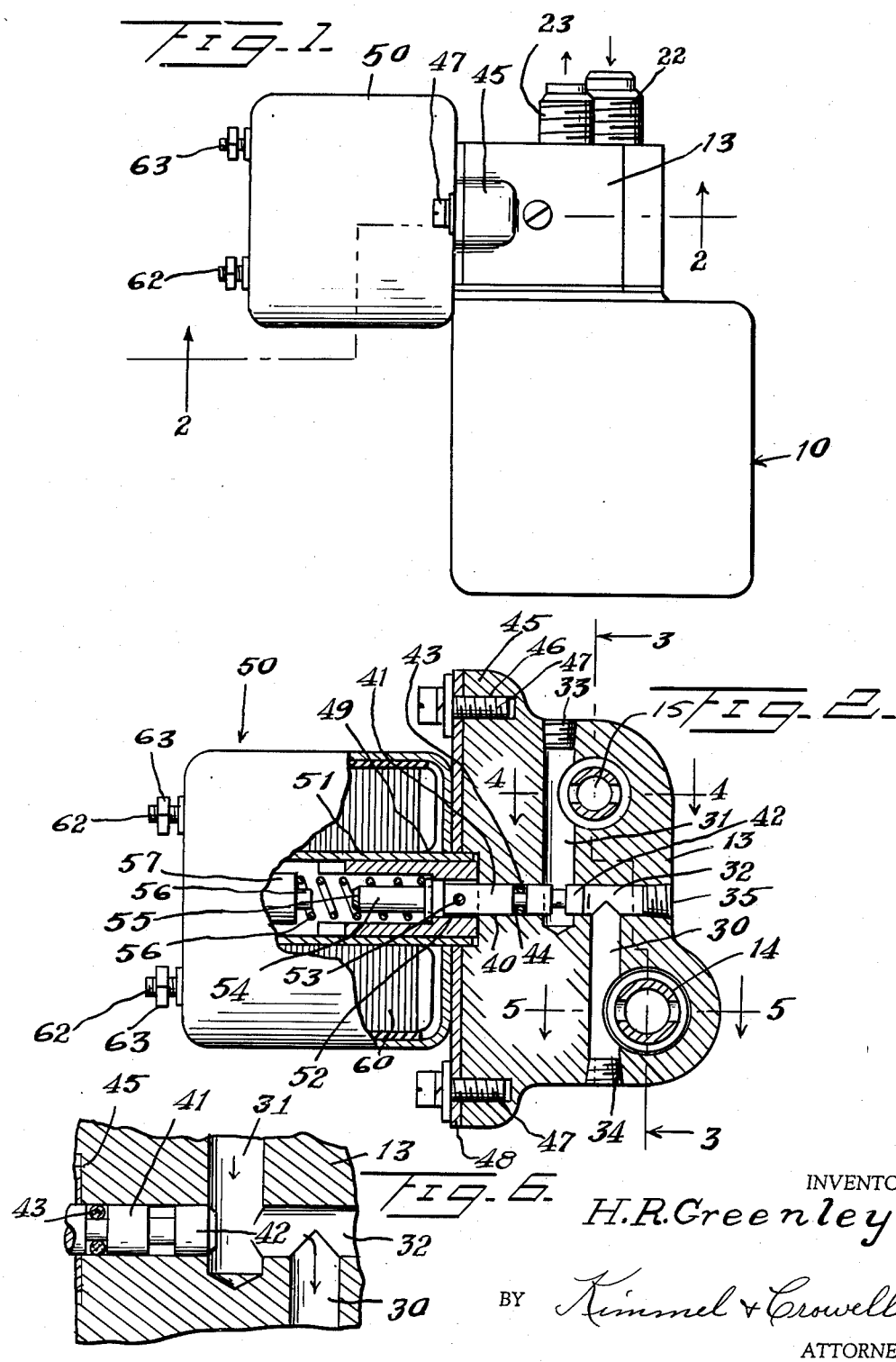

United States Patent Office 2,732,168
Patented Jan. 24, 1956

2,732,168

BY-PASS VALVE FOR POWER STEERING SYSTEMS

Henry Richard Greenley, Detroit, Mich., assignor to Airway Products, Inc., Pontiac, Mich.

Application January 13, 1954, Serial No. 403,681

2 Claims. (Cl. 251—142)

This invention relates to a by-pass valve for a power steering system and has as its primary object the provision of a valve which may be employed to preclude the building up of pressure within the steering system.

As conducive to a clearer understanding of this invention, it may here be pointed out that in power steering systems the power for turning the vehicle wheels is customarily derived from a hydraulic or fluid pressure system, and one of the difficulties involved in such a system arises from the build up of pressure from the pump under resistance of steering effort. An important object of this invention is therefore the provision of a by-pass valve assembly adapted to be interposed in the pressure system and preferably connected to the inlet and outlet ports of the pump whereby the outlet or pressure port may be placed in direct communication with the inlet or return port, when desired, so that the magnitude of pressure is directly proportional to the resistance of steering effort.

An additional object of the invention is the provision of a by-pass valve construction of this nature with a solenoid operated mechanism so constructed that the valve may be held in open position with a relatively low rate of current consumption, a plurality of solenoid coils being provided for this purpose.

A further object of this invention is the provision of a construction, as set forth in the foregoing object wherein there is provided an actuating coil and a holding coil for the solenoid, including means whereby the actuating coil is deenergized after the valve communicating with the inlet and outlet ports has initially been moved to open position.

A further object of the invention is the provision of a by-pass valve structure for a fluid pressure line wherein the end of the valve plug confronts the return passage and is movable into the return passage so that the power necessary to move the valve plug may be relatively low, since the fluid pressure in the return line serves to enhance the requisite power.

Another object resides in the provision of a valve bypass construction including a double coil solenoid operator having a main coil and an auxiliary holding coil of low current consumption, and switch means operable by the movement of the solenoid core for cutting off the main coil when the valve plug is in fluid by-passing position.

A further object of this invention is to eliminate the tendency to over steer in high speed driving.

Still other objects reside in the combination of elements, arrangements of parts and features of construction, all as will be more fully pointed out hereinafter and disclosed in the accompanying drawing wherein there is shown a preferred embodiment of this inventive concept.

In the drawings:

Figure 1 is a side elevational view of one form of the device embodying features of the instant invention shown as attached to the pump of a power steering system;

Figure 2 is an enlarged sectional view taken substantially along the line 2—2 of Figure 1, as viewed in the direction indicated by the arrows;

Figure 3 is an enlarged sectional view taken substantially along the line 3—3 of Figure 2, as viewed in the direction indicated by the arrows;

Figure 4 is an enlarged sectional view taken substantially along the line 4—4, as viewed in the direction indicated by the arrows;

Figure 5 is an enlarged sectional view taken substantially along the line 5—5, as viewed in the direction indicated by the arrows;

Figure 6 is a fragmentary sectional view on an enlarged scale showing portions of the structure of Figure 2 with the valve assembly in a different position of adjustment; and Figure 7 is a schematic wiring diagram of the solenoid assembly.

Similar reference characters refer to similar parts throughout the several views of the drawings.

Referring now to the drawings in detail, there is generally indicated at 10 a fluid pump that can be utilized with a power steering system for vehicles, including the customary inlet and outlet ports or return and pressure ports 11 and 12 respectively.

The construction of the instant invention comprises a body portion 13, including tubular passages 14 and 15, each provided with internal threaded fittings 16 and 17 respectively, adapted to be positioned in and threadedly engaged with inlet and outlet ports 11 and 12 respectively. These fittings are of conventional design and include sealing gaskets 18 and 19 and additional sealing gaskets 20 and 21 positioned between the side of the pump 10 and the body of the fitting 13. The opposite ends of passageways 14 and 15 respectively are provided with threaded fittings 22 and 23 respectively, each provided with sealing gaskets 24 and 25, the members 22 and 23 being adapted to be connected to the return and power lines respectively of the power steering system.

As best shown in Figure 2, the passages 14 and 15 respectively include intersecting by-pass bores 30 and 31 respectively positioned at right angles thereto and intersecting a common transversely extending passage 32. Bores 30 and 31 and the passage 32 may be drilled into the body 13 and their outer ends closed by threaded plugs 33, 34 and 35 respectively. A bore 40 extends through the body 13, in alignment with passage 32, and contains a slidable valve member 41 which terminates in a valve head 42 adapted, when in closed position, to seat in the passageway 32, thus blocking the passage of fluid between bores 30 and 31, and consequently between inlet and outlet bores 14 and 15.

A sealing washer 43 surrounds a reduced portion 44 of valve stem 41 to preclude the passage of any fluid into the bore.

The body 13 is provided on opposite sides with lugs 45 containing threaded bores 46 for the accommodation of bolts 47 which secure thereto an end plate 48 and having a central aperture therein for the accommodation of a sleeve 49 comprising a portion of a solenoid structure generally indicated at 50. The sleeve 49 has secured thereto a solenoid core member 51 having central aperture 52 into which extends the end of valve stem 41 which is secured, as by means of a pin 53, to a solenoid core 51. A collar or washer 55 is fixed on spring guide 54 integral with valve stem 41 and is biased, as by a coil spring 56, outwardly to force valve head 42 into closing position in passageway 32. A switch 57, having a push button type actuating head 58, is positioned in the path of travel of guide 54, and the sleeve 49 is surrounded by a pair of solenoid coils 60 and 61 (see Figure 7). The coils include central stems 62 and are secured in position as by means of nuts 63 positioned exteriorly of the solenoid housing 50. The wiring arrangement for solenoid coils 60 and 61 is best shown in Figure 7. The coil 60 surrounding solenoid core 51 is grounded as at 65 and has its other end connected as by a wire 66 to a terminal 67 on a line 68 which extends to one terminal 70 of a switch member 71, from the other terminal 72 of which a wire 73 extends to a battery 74 or similar source of power, which is grounded by means of a wire 75. The switch 71 is manually controlled and may be located at a remote location, as for example on the dashboard of a vehicle or the like.

In the use and operation of the device, when the power steering is to be turned off, switch 71 is closed, which energizes both holding coil 60 and actuating coil 61, whereupon the valve head 42 is withdrawn from the passageway 32 and fluid is by-passed from power passage 15 through bore 31 to passageway 32 and bore 30 to return or inlet passage 14, thus precluding the build-up of further pressure in the system. The withdrawal of valve 41 through solenoid core 51 occasions the engagement of solenoid core 51 with actuating button 58 of switch 57 to open the switch and deenergize actuating coil 61. Holding coil 60, requiring less electric power, remains closed so long as switch 71 is closed and has sufficient power, to retain the valve in open position against the bias of spring 56.

From the foregoing it will now be seen that there is herein provided an improved by-pass valve construction for power operated steering systems for vehicles which precludes the building up of pressure in the system thus eliminating power steering assist, and which accomplishes all of the objects of this invention and others, including many advantages of great practical utility and commercial importance.

As many embodiments may be made of this inventive concept, and as many modifications may be made of the embodiment hereinbefore shown and described, it is to be understood that all matter herein is to be interpreted merely as illustrative and not in a limiting sense.

What I claim is:

1. A by-pass valve for interposing in a fluid pressure system having a pump provided with a pressure port and a return port, a valve housing having a pair of openings therethrough and an internal passage connecting said openings together, a connector engaging through each opening for connection with the pump and the adjacent ends of the system, each connector having a peripheral groove and a radial opening whereby fluid may flow from one connector through said passage into the other connector, a normally closed valve plug slidable in said housing and intersecting said passage, and means connected with said valve plug for moving the latter to open position.

2. A by-pass valve for interposing in a fluid pressure system having a pump provided with a pressure port and a return port, a valve housing having a pair of openings therethrough and an internal passage connecting said openings together, a connector engaging through each opening for connection with the pump and the adjacent ends of the system, each connector having a peripheral groove and a radial opening whereby fluid may flow from one connector through said passage into the other connector, a normally closed valve plug slidable in said housing and intersecting said passage, and an electric operator connected with said valve plug for moving the latter to open position.

References Cited in the file of this patent
UNITED STATES PATENTS

| | | |
|---|---|---|
| 1,665,382 | Storey | Apr. 10, 1928 |
| 1,722,960 | Funston | July 30, 1929 |
| 1,755,057 | Fagan | Apr. 15, 1930 |
| 2,519,607 | Steynor | Aug. 22, 1950 |
| 2,556,675 | Carnagua | June 12, 1951 |

FOREIGN PATENTS

| | | |
|---|---|---|
| 623,752 | Great Britain | May 23, 1949 |